US012626844B2

(12) United States Patent
Takajo et al.

(10) Patent No.: US 12,626,844 B2
(45) **Date of Patent: *May 12, 2026**

(54) METHOD OF MANUFACTURING GRAIN-ORIENTED ELECTRICAL STEEL SHEET

(71) Applicant: JFE STEEL CORPORATION, Tokyo (JP)

(72) Inventors: Shigehiro Takajo, Tokyo (JP); Hiroi Yamaguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 366 days.

This patent is subject to a terminal disclaimer.

(21) Appl. No.: 18/547,693

(22) PCT Filed: Mar. 2, 2022

(86) PCT No.: PCT/JP2022/008970

§ 371 (c)(1),
(2) Date: Aug. 24, 2023

(87) PCT Pub. No.: WO2022/186300

PCT Pub. Date: Sep. 9, 2022

(65) Prior Publication Data

US 2024/0136095 A1 Apr. 25, 2024
US 2024/0233992 A9 Jul. 11, 2024

(30) Foreign Application Priority Data

Mar. 4, 2021 (JP) ................................ 2021-034819

(51) Int. Cl.

| | |
|---|---|
| ***H01F 1/147*** | (2006.01) |
| ***C21D 1/18*** | (2006.01) |
| ***C21D 6/00*** | (2006.01) |
| ***C21D 8/12*** | (2026.01) |
| ***C21D 8/1205*** | (2026.01) |
| ***C21D 8/1216*** | (2026.01) |
| ***C21D 8/1244*** | (2026.01) |
| ***C21D 8/1277*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/14*** | (2006.01) |
| ***C22C 38/16*** | (2006.01) |
| ***C22C 38/22*** | (2006.01) |
| ***C22C 38/34*** | (2006.01) |

(Continued)

(52) U.S. Cl.

CPC ........... *H01F 1/14783* (2013.01); *C21D 1/18* (2013.01); *C21D 6/002* (2013.01); *C21D 6/004* (2013.01); *C21D 6/005* (2013.01); *C21D 6/008* (2013.01); *C21D 8/1211* (2013.01); *C21D 8/1222* (2013.01); *C21D 8/1233* (2013.01); *C21D 8/125* (2013.01); *C21D 8/1261* (2013.01); *C21D 8/1272* (2013.01); *C21D 8/1283* (2013.01); *C21D 8/1288* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/22* (2013.01); *C22C 38/34* (2013.01); *C22C 38/42* (2013.01); *C22C 38/48* (2013.01); *C22C 38/60* (2013.01); *C22C 2202/02* (2013.01)

(58) Field of Classification Search

None

See application file for complete search history.

(56) References Cited

U.S. PATENT DOCUMENTS 3,932,234 A 1/1976 Imanaka et al.
5,885,371 A * 3/1999 Komatsubara ....... C21D 8/1222 148/113

(Continued)

FOREIGN PATENT DOCUMENTS

CN 1190132 A 8/1998
CN 108699621 A 10/2018

(Continued)

OTHER PUBLICATIONS

Machine translation of JPH0310020A. (Year: 1991).*

May 17, 2022, International Search Report issued in the International Patent Application No. PCT/JP2022/008970.

Apr. 22, 2024, the Extended European Search Report issued by the European Patent Office in the corresponding European Patent Application No. 22763353.4.

Mar. 29, 2025, Office Action issued by the China National Intellectual Property Administration in the corresponding Chinese Patent Application No. 202280017938.7 with English language search report.

*Primary Examiner* — Xiaowei Su

(74) *Attorney, Agent, or Firm* — KENJA IP LAW PC

(57) ABSTRACT

The method includes slab-heating a steel slab to a temperature of higher than a γ-phase precipitation temperature and 1380° C. or lower, subjecting the steel slab to rough rolling including at least two passes of rolling at a predetermined temperature with an introduced sheet thickness true strain $\varepsilon_t$ of 0.50 or more and to finish rolling with a rolling finish temperature of 900° C. or higher to obtain a hot-rolled sheet, cooling the hot-rolled sheet for 1 second or longer at a cooling rate of 70° C./s or higher within 2 seconds after finish rolling, coiling the sheet at a coiling temperature of 600° C. or lower, performing hot-rolled sheet annealing for soaking at a predetermined soaking temperature, and then performing cold rolling, primary recrystallization annealing, and secondary recrystallization annealing.

20 Claims, No Drawings

(51) Int. Cl.

| | |
|---|---|
| ***C22C 38/42*** | (2006.01) |
| ***C22C 38/48*** | (2006.01) |
| ***C22C 38/60*** | (2006.01) |

(56) References Cited

U.S. PATENT DOCUMENTS

| | | | | |
|---|---|---|---|---|
| 9,761,360 | B2 | 9/2017 | Takenaka et al. | |
| 11,680,302 | B2 * | 6/2023 | Fujimura ............. | C21D 8/1222 148/111 |
| 2012/0222777 | A1 | 9/2012 | Fortunati et al. | |
| 2013/0174940 | A1 | 7/2013 | Cicale et al. | |
| 2015/0332822 | A1 | 11/2015 | Takenaka et al. | |
| 2018/0258508 | A1 | 9/2018 | Fujimura et al. | |
| 2018/0305784 | A1 | 10/2018 | Fujimura et al. | |
| 2019/0271054 | A1 | 9/2019 | Ehashi et al. | |
| 2020/0040419 | A1 | 2/2020 | Takenaka et al. | |
| 2022/0042135 | A1 | 2/2022 | Han et al. | |
| 2024/0133003 | A1 * | 4/2024 | Takajo .................... | C22C 38/22 |
| 2024/0136095 | A1 | 4/2024 | Takajo et al. | |

FOREIGN PATENT DOCUMENTS

| | | | |
|---|---|---|---|
| CN | 110291214 | A | 9/2019 |
| JP | S4015644 | B | 7/1965 |
| JP | S5113469 | B2 | 4/1976 |
| JP | H0310020 | A | 1/1991 |
| JP | H09316537 | A | 12/1997 |
| JP | H10121135 | A | 5/1998 |
| JP | 2001060505 | A | 3/2001 |
| JP | 2013512332 | A | 4/2013 |
| JP | 2017110263 | A | 6/2017 |
| KR | 1020060074649 | A | 7/2006 |
| WO | 2013145784 | A1 | 10/2013 |
| WO | 2020130328 | A1 | 6/2020 |

* cited by examiner

METHOD OF MANUFACTURING GRAIN-ORIENTED ELECTRICAL STEEL SHEET

TECHNICAL FIELD

This disclosure relates to a method of manufacturing a grain-oriented electrical steel sheet.

BACKGROUND

Grain-oriented electrical steel sheets are mainly used as materials for iron cores inside transformers. It has been required to reduce iron loss in grain-oriented electrical steel sheets to improve the energy use efficiency of transformers. Examples of methods to reduce the iron loss of a grain-oriented electrical steel sheet include methods of increasing the specific resistance of the steel sheet, increasing the film tension, and reducing the thickness of the steel sheet, as well as a method of performing surface treatment on the steel sheet, and a method of sharpening the crystal orientation of crystal grain to {110}<001> orientation (hereinafter referred to as "Goss orientation"). The iron loss W17/50 per kg of the steel sheet when the steel sheet is magnetized to 1.7 T in an AC magnetic field with an excitation frequency of 50 Hz is mainly used as an index of magnetic properties, and, especially, the magnetic flux density $B_8$ at a magnetic field strength of 800 A/m is mainly used as an index of sharpening of the crystal orientation of crystal grain to {110}<001> orientation (hereinafter referred to as "Goss orientation"). To increase the integration degree of the Goss orientation, it is important to create difference in grain boundary mobility so that only sharp Goss-oriented grains grow preferentially, that is, to make the texture of a primary recrystallized sheet into a specified structure, and it is important to utilize precipitates called inhibitors to suppress the growth of recrystallized grains other than Goss-oriented grains. For example, JP S40-15644 B (PTL 1) describes a method of using MN and MnS, and JP S51-13469 B (PTL 2) describes a method of using MnS and MnSe, as techniques that utilize inhibitors, and both methods have been put into practical use industrially.

These inhibitors are preferably dispersed in steel uniformly and finely. Therefore, in a method that utilizes inhibitors, it is common to performing slab heating at high temperatures of 1300° C. or higher before hot rolling to solubilize inhibitor components and precipitate them finely in subsequent processes. For example, in JP 2001-60505 A (PTL 3), steel is added with Al, hot-rolled sheet annealing is performed at 750° C. to 1200° C. after hot rolling, and then rapid cooling is performed to precipitate fine MN to obtain an extremely high magnetic flux density.

On the other hand, a method of manufacturing a grain-oriented electrical steel sheet that does not rely on inhibitors (inhibitor-less method) is also being studied. The method that does not rely on inhibitors is characterized by the use of steel with higher purity and the development of secondary recrystallization by controlling a crystal texture. This method does not require slab heating at high temperatures to solubilize inhibitor components, and therefore it is possible to manufacture a grain-oriented electrical steel sheet at low costs. For example, PTL 3 describes that the presence of many crystal grains in {554}<225> orientation and many crystal grains in {411}<148> orientation in a primary recrystallized texture increases the integration to the Goss orientation after secondary recrystallization and increases the magnetic flux density.

CITATION LIST

Patent Literature

PTL 1: JP S40-15644 B
PTL 2: JP S51-13469 B
PTL 3: JP 2001-60505 A

SUMMARY

Technical Problem

To increase the magnetic flux density of a grain-oriented electrical steel sheet, it is necessary to strictly control the texture of a primary recrystallized sheet as well as inhibitors. However, fine particle distribution of inhibitors in steel, which is for the purpose of active use of inhibitors, usually refine the texture before cold rolling, rendering it difficult to control the primary recrystallized texture. In conventional manufacturing processes of a grain-oriented electrical steel sheet, fine inhibitors are formed during hot-rolled sheet annealing, and these inhibitors significantly inhibit the grain growth of recrystallized grains in a subsequent intermediate annealing process. Further, as the crystal grain size before cold rolling increases, the frequently of the formation of Goss-oriented grains in a subsequent primary recrystallization process also increases. Therefore, fine crystal grains in intermediate annealing are extremely disadvantageous to the formation of Goss orientation.

It could thus be helpful to provide a method of manufacturing a grain-oriented electrical steel sheet that exhibits excellent magnetic properties compared to conventional techniques, by strictly controlling the texture of a primary recrystallized sheet and actively utilizing inhibitors.

Solution to Problem

We made intensive studies to solve the above problem. As a result, we found that, in order to form a texture that is suitable for obtaining good magnetic properties in a primary recrystallized sheet, it is important not only to coarsen crystal grains before cold rolling but also to increase the presence frequency of crystal grains with low strain before cold rolling. We also found that, in order to increase the presence frequency of crystal grains with low strain before cold rolling, heavy rolling in a temperature range where a γ-phase fraction reaches its maximum and the number of passes are important among the conditions of rough rolling during hot rolling. Further, we found that, by changing the temperature of hot-rolled sheet annealing in accordance with the proportion of low-strain crystal grains in a hot-rolled sheet and introducing skin pass rolling, it is possible to create a good primary recrystallized texture while actively utilizing inhibitors to obtain an extremely high magnetic flux density after secondary recrystallization annealing, thereby completing the present disclosure.

The present disclosure is based on these findings. Specifically, primary features of the present disclosure are as follows.

[1] A method of manufacturing a grain-oriented electrical steel sheet, comprising:

preparing a steel slab having a chemical composition containing (consisting of)

C: 0.005 mass % to 0.085 mass %,

Si: 2.00 mass % to 4.50 mass %,

Mn: 0.03 mass % to 1.00 mass %, sol.Al: 0.008 mass % or more and less than 0.030 mass %, and N: 0.004 mass % to 0.009 mass % or less, and further containing either or both of S: 0.0005 mass % to 0.02 mass % and Se: 0.0005 mass % to 0.02 mass %, with the balance being Fe and inevitable impurities, subjecting the steel slab to slab heating to a temperature of higher than a γ-phase precipitation temperature and 1380° C. or lower, next, subjecting the steel slab to rough rolling including at least two passes of rolling at a temperature of (temperature at which γ-phase fraction reaches its maximum −20° C.) or higher with an introduced sheet thickness true strain $\varepsilon_t$ of 0.50 or more to obtain a rough-rolled sheet, next, subjecting the rough-rolled sheet to finish rolling where a rolling finish temperature is 900° C. or higher to obtain a hot-rolled sheet, next, cooling the hot-rolled sheet for 1 second or longer at a cooling rate of 70° C./s or higher within 2 seconds after an end of the finish rolling, coiling the hot-rolled sheet obtained after cooling at a coiling temperature of 600° C. or lower, next, subjecting the hot-rolled sheet obtained after coiling to hot-rolled sheet annealing for soaking at a soaking temperature of 1000° C. or higher and (1150-2.5Y) ° C. or lower for 60 seconds or longer to obtain a hot-rolled and annealed sheet, where Y (%) is a recrystallization ratio of a sheet thickness central layer of the hot-rolled sheet obtained after coiling, next, subjecting the hot-rolled and annealed sheet to cold rolling at a rolling ratio of 88% or more and 91% or less to obtain a cold-rolled sheet with a final sheet thickness, next, subjecting the cold-rolled sheet to primary recrystallization annealing to obtain a primary recrystallization annealed sheet, and next, subjecting the primary recrystallization annealed sheet to secondary recrystallization annealing to obtain a grain-oriented electrical steel sheet, wherein the sheet thickness true strain $\varepsilon_t$ is calculated by the following equation (1)

$$\varepsilon_t = (\text{sheet thickness after rolling}/\text{sheet thickness before rolling}) \quad (1).$$

[2] The method of manufacturing a grain-oriented electrical steel sheet according to aspect [1], wherein the chemical composition further contains at least one selected from the group consisting of Sb: 0.005 mass % to 0.500 mass %, and Sn: 0.005 mass % to 0.500 mass %.

[3] The method of manufacturing a grain-oriented electrical steel sheet according to aspect [1] or [2], wherein the chemical composition further contains at least one selected from the group consisting of Ni: 0.01 mass % to 1.50 mass %, Cr: 0.005 mass % to 0.50 mass %, Cu: 0.03 mass % to 0.50 mass %, P: 0.005 mass % to 0.500 mass %, As: 0.0005 mass % to 0.050 mass %, Bi: 0.005 mass % to 0.500 mass %, Mo: 0.005 mass % to 0.100 mass %, B: 0.0002 mass % to 0.0025 mass %, Te: 0.0005 mass % to 0.0100 mass %, Zr: 0.001 mass % to 0.010 mass %, Nb: 0.001 mass % to 0.010 mass %, V: 0.001 mass % to 0.010 mass %, and Ta: 0.001 mass % to 0.010 mass %.

[4] The method of manufacturing a grain-oriented electrical steel sheet according to any one of aspects [1] to [3], wherein the rough rolling includes at least one pass of rolling at a temperature of (temperature at which γ-phase fraction reaches its maximum −20° C.) or higher and (temperature at which γ-phase fraction reaches its maximum +50° C.) or lower.

[5] The method of manufacturing a grain-oriented electrical steel sheet according to any one of aspects [1] to [4], wherein the rough rolling has four or more passes in total.

[6] The method of manufacturing a grain-oriented electrical steel sheet according to any one of aspects [1] to [5], wherein the hot-rolled sheet obtained after soaking is subjected to cooling where a first average cooling rate $v_1$ from the soaking temperature to 800° C. is lower than 40° C./s and a second average cooling rate $v_2$ from 800° C. to 650° C. is equal to or higher than $v_1$.

[7] The method of manufacturing a grain-oriented electrical steel sheet according to any one of aspects [1] to [6], wherein the recrystallization ratio Y is 18% or higher.

[8] The method of manufacturing a grain-oriented electrical steel sheet according to any one of aspects [1] to [7], wherein the recrystallization ratio Y is 20% or higher, and skin pass rolling with an elongation rate of 0.05% or more is performed after an end of the finish rolling and before hot-rolled sheet annealing.

[9] The method of manufacturing a grain-oriented electrical steel sheet according to any one of aspects [1] to [8], wherein a magnetic flux density $B_8$ in a rolling direction of the grain-oriented electrical steel sheet is 1.940 T or higher.

Advantageous Effect

According to the present disclosure, it is possible to provide a method of manufacturing a grain-oriented electrical steel sheet that exhibits excellent magnetic properties compared to conventional techniques, by strictly controlling the texture of a primary recrystallized sheet and actively utilizing inhibitors.

DETAILED DESCRIPTION

First, the experiments that led to the present disclosure will be described. We first carefully observed the crystal structure of a hot-rolled sheet to verify whether or not coarsening crystal grains before cold rolling is effective in forming a texture suitable for improving the magnetic properties in a primary recrystallized sheet of a grain-oriented electrical steel sheet.

<<Experiment 1>>

A steel material (C: 0.060 mass %, Si: 3.40 mass %, Mn: 0.06 mass %, sol.Al: 0.014 mass %, N: 0.007 mass %, S: 0.020 mass %, and Sb: 0.035 mass %) with the balance being Fe and inevitable impurities was prepared by steelmaking and formed into a steel slab, and then the steel slab was slab-heated to 1310° C. Next, the steel slab was subjected to rough rolling, including one-pass rolling with a sheet thickness true strain $\varepsilon_t$ of 0.6 at 1200° C., one-pass rolling with a sheet thickness true strain $\varepsilon_t$ of 0.4 at 1150° C., and one-pass rolling with a sheet thickness true strain $\varepsilon_t$ of 0.4 at 1100° C., to obtain a rough-rolled sheet. Next, the rough-rolled sheet was subjected to finish rolling with the rolling finish temperature being 1050° C. to obtain a hot-rolled sheet with a thickness of 2.2 mm. Next, 1 second after the end of finish rolling, the steel sheet was cooled at a cooling rate of 80° C./s for 5 seconds and then coiled at a coiling temperature of 520° C. Next, the hot-rolled sheet was subjected to hot-rolled sheet annealing, in which the hot-rolled sheet was soaked at 1100° C. for 90 seconds, then allowed to naturally cool to 600° C. to 450° C. for 2 minutes, and then water-cooled to 100° C., to obtain a hot-rolled and annealed sheet. Next, the hot-rolled and annealed sheet was subjected to cold rolling at a rolling ratio of 90% to obtain a cold-rolled sheet with a final sheet thickness of 0.22 mm. Next, the cold-rolled sheet was subjected to primary recrystallization annealing to obtain a primary recrystallization annealed sheet, and then the primary recrystallization annealed sheet was subjected to secondary recrystallization annealing to obtain a grain-oriented electrical steel sheet, with known methods.

As a result of observing the microstructure of a vertical section parallel to the rolling direction (L-section) of the hot-rolled sheet after coiling, many crystal grains elongated (extending) in the rolling direction were observed. It is considered that the crystal grains elongated in the rolling direction are caused by residual strain. As used herein, the crystal grain elongated in the rolling direction is defined as a crystal grain whose ratio of diameter in the rolling direction to diameter in the thickness direction is 2.0 or more. The recrystallization ratio Y of the sheet thickness central layer, which will be discussed later, was 5%. Further, as a result of observing the microstructure of the L-section of the hot-rolled and annealed sheet, many crystal grains elongated in the rolling direction were observed. The magnetic flux density $B_8$ of the grain-oriented electrical steel sheet after secondary recrystallization annealing was evaluated by the Epstein test described below, and the result was 1.930 T. Note that $B_8$ means the magnetic flux density of a sample when the sample is excited with a magnetizing force of 800 A/m in the rolling direction.

Next, a steel slab having the same chemical composition as above was prepared in the same way as above. The steel slab was slab-heated to 1310° C. Next, the steel slab was subjected to rough rolling, including one-pass rolling with a sheet thickness true strain $\varepsilon_t$ of 0.5 at 1220° C., one-pass rolling with a sheet thickness true strain $\varepsilon_t$ of 0.4 at 1180° C., and one-pass rolling with a sheet thickness true strain $\varepsilon_t$ of 0.5 at 1140° C., to obtain a rough-rolled sheet. Next, the rough-rolled sheet was subjected to finish rolling with the rolling finish temperature being 1050° C. to obtain a hot-rolled sheet with a thickness of 2.2 mm. Next, 1 second after the end of finish rolling, the hot-rolled sheet was cooled at a cooling rate of 80° C./s for 5 seconds and then coiled at a coiling temperature of 520° C. Next, the hot-rolled sheet was subjected to hot-rolled sheet annealing at 1100° C. for 60 seconds to obtain a hot-rolled and annealed sheet. Next, the hot-rolled and annealed sheet was subjected to primary cold rolling to obtain a cold-rolled sheet with a final sheet thickness of 0.22 mm.

Next, the cold-rolled sheet was subjected to primary recrystallization annealing to obtain a primary recrystallization annealed sheet, and then the primary recrystallization annealed sheet was subjected to secondary recrystallization annealing to obtain a grain-oriented electrical steel sheet, with the same methods as above.

As a result of observing the microstructure of the L-section of the hot-rolled sheet after coiling, many crystal grains elongated in the rolling direction were observed as in the above. However, the recrystallization ratio Y, which will be described later, was higher than the above and was 20%. Further, as a result of observing the microstructure of the L-section of the hot-rolled and annealed sheet, it was found that the proportion of crystal grains elongated in the rolling direction was lower than in the above example. The magnetic flux density $B_8$ of the grain-oriented electrical steel sheet after secondary recrystallization annealing was evaluated by the Epstein test, and the result was 1.941 T.

According to the above results, we have found that a rough rolling process of hot rolling has a strong influence on the microstructure of a hot-rolled sheet. Further, we conceived that, by properly controlling the microstructure of a hot-rolled sheet, the magnetic flux density of a grain-oriented electrical steel sheet obtained after secondary recrystallization annealing increases. In a method that actively utilizes inhibitors, recrystallization is less likely to occur during hot rolling because of the high slab heating temperature and large crystal grains obtained after heating. Therefore, we believe that it is effective to control the microstructure of a hot-rolled sheet by optimizing the rough rolling conditions in a method that actively utilizes inhibitors, and we completed the present disclosure.

We also believed that, if the microstructure of a hot-rolled sheet can be properly controlled, a hot-rolled sheet annealing temperature suitable for a method that actively utilizes inhibitors can be determined in a novel way.

Based on the above, we further conducted the following experiments.

<<Experiment 2>>

A steel material (C: 0.065 mass %, Si: 3.40 mass %, Mn: 0.060 mass %, sol.Al: 0.017 mass %, N: 0.007 mass %, Se: 0.006 mass %, and Sb: 0.035 mass %) with the balance being Fe and inevitable impurities was prepared by steelmaking and formed into a steel slab. Next, the steel slab was slab-heated to 1330° C., and subjected to rough rolling, including one-pass rolling with a sheet thickness true strain $\varepsilon_t$ of 0.6 at 1200° C., one-pass rolling with a sheet thickness true strain $\varepsilon_t$ of 0.5 at 1150° C., and one-pass rolling with a sheet thickness true strain $\varepsilon_t$ of 0.4 at 1100° C., to obtain a rough-rolled sheet. Next, the rough-rolled sheet was subjected to finish rolling with the rolling finish temperature being 1060° C. to obtain a hot-rolled sheet with a thickness of 2.1 mm. Next, 1 second after the end of finish rolling, the hot-rolled sheet was cooled at a cooling rate of 80° C./s for 5 seconds and then coiled at a coiling temperature of 520° C. The hot-rolled sheet thus obtained is hereinafter referred to as “hot-rolled sheet A”. Further, a steel slab with the same chemical composition as above was slab-heated to 1310° C., and subjected to rough rolling, including one-pass rolling with a sheet thickness true strain of 0.6 at 1220° C., one-pass rolling with a sheet thickness true strain of 0.3 at 1180° C., and one-pass rolling with a sheet thickness true strain of 0.4 at 1100° C., to obtain a rough-rolled sheet. Next, the rough-rolled sheet was subjected to finish rolling with the rolling finish temperature being 1060° C. to obtain a hot-rolled sheet with a thickness of 2.1 mm. Next, 1 second after the end of finish rolling, the steel sheet was cooled at a cooling rate of 80° C./s for 5 seconds and then coiled at a coiling temperature of 520° C. The hot-rolled sheet thus obtained is hereinafter referred to as “hot-rolled sheet B”. The hot-rolled sheet A and the hot-rolled sheet B were each subjected to hot-rolled sheet annealing under four sets of conditions: 1030° C. for 90 seconds, 1070° C. for 90 seconds, 1100° C. for 90 seconds, and 1130° C. for 90 seconds, to obtain hot-rolled and annealed sheets. Next, the hot-rolled and annealed sheet was subjected to cold rolling at a rolling ratio of 90% to obtain a cold-rolled sheet with a final sheet thickness of 0.22 mm. Next, the cold-rolled sheet was subjected to primary recrystallization annealing to obtain a primary recrystallization annealed sheet, and then the primary recrystallization annealed sheet was subjected to secondary recrystallization annealing to obtain a grain-oriented electrical steel sheet, with known methods. Table 1 lists the magnetic flux density $B_8$ of grain-oriented electrical steel sheets using the hot-rolled sheets A and B. In experiments using the hot-rolled sheet A, the hot-rolled sheet annealing temperature at which the magnetic flux density of the grain-oriented electrical steel sheet reached its maximum was 1100° C. On the other hand, in experiments using the hot-rolled sheet B, the hot-rolled sheet annealing temperature at which the magnetic flux density of the grain-oriented electrical steel sheet reached its maximum was 1130° C.

TABLE 1

| Hot-rolled sheet annealing soaking temperature (° C.) | Magnetic flux density $B_8$ obtained in experiment using hot-rolled sheet A (T) | Magnetic flux density $B_8$ obtained in experiment using hot-rolled sheet B (T) |
|---|---|---|
| 1030 | 1.932 | 1.926 |
| 1070 | 1.940 | 1.929 |
| 1100 | 1.942 | 1.932 |
| 1130 | 1.935 | 1.936 |

Based on the above results, we came to the conclusion that the magnetic flux density may be further increased by appropriately determining the conditions of hot-rolled sheet annealing according to the microstructure of a hot-rolled sheet.

Next, we conducted the following experiments to further investigate the influence of rough rolling on the recrystallization ratio Y of a hot-rolled sheet.

<<Experiment 3>>

A steel material (C: 0.060 mass %, Si: 3.40 mass %, Mn: 0.060 mass %, sol.Al: 0.017 mass %, N: 0.008 mass %, Se: 0.006 mass %, Cu: 0.03%, As: 0.005 mass %, and Sb: 0.02 mass %) with the balance being Fe and inevitable impurities was prepared by steelmaking and formed into a steel slab, and then the steel slab was slab-heated to 1330° C. Next, the steel slab was subjected to rough rolling under various rolling schedule conditions to obtain a rough-rolled sheet. Next, the rough-rolled sheet was subjected to finish rolling with the rolling finish temperature being 1040° C. to 1100° C. to obtain a hot-rolled sheet with a thickness of 2.2 mm. Next, 1 second after the end of finish rolling, the steel sheet was cooled at a cooling rate of 80° C./s for 5 seconds and then coiled at a coiling temperature of 500° C. to 550° C. The microstructure of the L-section of the hot-rolled sheet after coiling was observed, and the recrystallization ratio Y was evaluated. The method of evaluating the recrystallization ratio Y will be described later. The results are listed Table 2.

TABLE 2

| No. | 1st pass Strain (%) | 1st pass Temperature (° C.) | 2nd pass Strain (%) | 2nd pass Temperature (° C.) | 3rd pass Strain (%) | 3rd pass Temperature (C) | 4th pass Strain (%) | 4th pass Temperature (° C.) | Y (%) |
|---|---|---|---|---|---|---|---|---|---|
| 1 | 38 | 1250 | 62 | 1200 | 63 | 1155 | None | — | 20 |
| 2 | 53 | 1250 | 47 | 1200 | 63 | 1155 | None | — | 19 |
| 3 | 49 | 1250 | 54 | 1200 | 56 | 1155 | None | — | 18 |
| 4 | 37 | 1250 | 52 | 1200 | 69 | 1155 | None | — | 22 |
| 5 | 49 | 1250 | 61 | 1200 | 49 | 1120 | None | — | 12 |
| 6 | 37 | 1200 | 59 | 1120 | 63 | 1110 | None | — | 10 |
| 7 | 58 | 1250 | 36 | 1200 | 69 | 1110 | None | — | 15 |
| 8 | 32 | 1260 | 53 | 1230 | 51 | 1200 | 41 | 1110 | 20 |
| 9 | 49 | 1260 | 69 | 1210 | 63 | 1170 | None | — | 23 |
| 10 | 59 | 1260 | 55 | 1210 | 63 | 1170 | None | — | 24 |
| 11 | 71 | 1260 | 36 | 1210 | 69 | 1170 | None | — | 20 |
| 12 | 71 | 1260 | 50 | 1210 | 56 | 1170 | None | — | 22 |
| 13 | 67 | 1240 | 43 | 1200 | 49 | 1155 | None | — | 15 |
| 14 | 52 | 1200 | 69 | 1120 | 56 | 1100 | None | — | 10 |
| 15 | 52 | 1250 | 69 | 1200 | 56 | 1100 | None | — | 15 |
| 16 | 32 | 1250 | 35 | 1220 | 54 | 1200 | 56 | 1155 | 27 |
| 17 | 49 | 1160 | 54 | 1100 | 56 | 1000 | None | — | 3 |

Based on these results, we estimated the following tendencies (i) to (iii).

(i) A high recrystallization ratio Y of 15% or higher can be obtained in a hot-rolled sheet by subjecting a steel slab to rough rolling which includes at least two passes of rolling at a temperature of (temperature at which γ-phase fraction reaches its maximum −20° C.) or higher with an introduced sheet thickness true strain $\varepsilon_t$ of 0.50 or more. The temperature at which the γ-phase fraction reaches its maximum in this experiment is found to be 1150° C. by equilibrium calculation in advance.

(ii) A higher recrystallization ratio Y (18% or higher in the above results) can be obtained when the rough rolling during hot rolling includes at least one pass of rolling at a temperature of (temperature at which γ-phase fraction reaches its maximum −20° C.) or higher and (temperature at which γ-phase fraction reaches its maximum +50° C.) or lower.

(iii) An even higher recrystallization ratio Y (20% or higher in the above results) can be obtained when the number of rough rolling passes is 4 or more in total.

Next, we conducted experiments in which the soaking temperature in the subsequent hot-rolled sheet annealing was changed by several levels for each hot-rolled sheet with a different recrystallization ratio Y.

<<Experiment 4>>

First, the hot-rolled sheets with a sheet thickness of 2.2 mm obtained after coiling prepared in Experiment 3 were used as test materials, and they were subjected to hot-rolled sheet annealing at different soaking temperatures. The soaking time was set to 100 seconds. After soaking, the steel sheet was allowed to naturally cool to 600° C. to 450° C. for 2 minutes and then subjected to water cooling to 100° C. to obtain a hot-rolled and annealed sheet. After hot-rolled sheet annealing, the hot-rolled and annealed sheet was subjected to cold rolling at a rolling ratio of 90% to obtain a cold-rolled sheet with a final sheet thickness of 0.22 mm. Next, the cold-rolled sheet was subjected to primary recrystallization annealing to obtain a primary recrystallization annealed sheet, and then the primary recrystallization annealed sheet was subjected to secondary recrystallization annealing to obtain a grain-oriented electrical steel sheet, with known methods. The magnetic flux density $B_8$ of the obtained grain-oriented electrical steel sheet was evaluated by the Epstein test described below. Table 3 lists the soaking temperature of the hot-rolled sheet annealing and the magnetic flux density $B_8$ of the obtained grain-oriented electrical steel sheet. As a result of investigating the relationship between the recrystallization ratio Y of each hot-rolled sheet and the soaking temperature of the hot-rolled and annealed sheet at which the magnetic flux density $B_8$ reached its maximum, it has been clarified that a high magnetic flux density can be obtained when the soaking temperature of the hot-rolled sheet annealing is about (1150-2.5Y) ° C.

TABLE 3

| | Y | Soaking temperature (° C.) | | | | | | |
|---|---|---|---|---|---|---|---|---|
| No. | (%) | 1000 | 1050 | 1075 | 1100 | 1125 | 1150 | 1150-2.5Y |
| 1 | 20 | 1.873 | 1.913 | 1.940 | 1.942 | 1.925 | 1.893 | 1100 |
| 2 | 19 | 1.868 | 1.904 | 1.930 | 1.939 | 1.923 | 1.895 | 1103 |
| 3 | 18 | 1.865 | 1.905 | 1.931 | 1.939 | 1.921 | 1.899 | 1105 |
| 4 | 22 | 1.874 | 1.911 | 1.941 | 1.939 | 1.927 | 1.903 | 1095 |
| 5 | 12 | 1.844 | 1.892 | 1.923 | 1.930 | 1.929 | 1.914 | 1120 |
| 6 | 10 | 1.835 | 1.880 | 1.910 | 1.921 | 1.928 | 1.920 | 1125 |
| 7 | 15 | 1.840 | 1.884 | 1.918 | 1.933 | 1.925 | 1.909 | 1113 |
| 8 | 20 | 1.853 | 1.900 | 1.938 | 1.940 | 1.929 | 1.916 | 1100 |
| 9 | 23 | 1.864 | 1.901 | 1.935 | 1.943 | 1.930 | 1.911 | 1093 |
| 10 | 24 | 1.871 | 1.914 | 1.943 | 1.941 | 1.926 | 1.914 | 1090 |
| 11 | 20 | 1.853 | 1.898 | 1.929 | 1.939 | 1.924 | 1.900 | 1100 |
| 12 | 22 | 1.852 | 1.906 | 1.937 | 1.933 | 1.927 | 1.903 | 1095 |
| 13 | 15 | 1.845 | 1.890 | 1.928 | 1.934 | 1.921 | 1.906 | 1113 |
| 14 | 10 | 1.842 | 1.889 | 1.921 | 1.930 | 1.935 | 1.927 | 1125 |
| 15 | 15 | 1.831 | 1.881 | 1.924 | 1.932 | 1.927 | 1.899 | 1113 |
| 16 | 27 | 1.840 | 1.903 | 1.945 | 1.942 | 1.932 | 1.918 | 1083 |
| 17 | 3 | 1.827 | 1.874 | 1.905 | 1.914 | 1.921 | 1.915 | 1143 |

The following describes embodiments of the present disclosure. Note that the present disclosure is not limited to the following embodiments. First, the appropriate range of the chemical composition of a steel slab used as a material of the grain-oriented electrical steel sheet in the present disclosure and reasons for limitation will be described. In the following description, a numerical range expressed by using "to" means a range including numerical values described before and after "to", as the lower limit value and the upper limit value.

C: 0.005 mass % to 0.085 mass %

When the C content is less than 0.005 mass %, the grain boundary strengthening effect by C is lost, which causes cracks in the slab and hampers the manufacture. It also suppresses non-uniform deformation, which is caused by strain aging during a rolling process and is suitable for improving the magnetic properties. On the other hand, when the C content exceeds 0.085 mass %, it is difficult to reduce, by primary recrystallization annealing, the C content to 0.005 mass % or less that causes no magnetic aging. Therefore, the C content is set to a range of 0.005 mass % to 0.085 mass %. The C content is preferably 0.010 mass % or more and more preferably 0.030 mass % or more. The C content is preferably 0.080 mass % or less and more preferably 0.070 mass % or less.

Si: 2.00 Mass % to 4.50 Mass %

Si is an important element for increasing the specific resistance of the steel sheet and reducing the iron loss. These effects cannot be fully exhibited when Si is added in an amount of less than 2.00 mass %. On the other hand, when the Si content exceeds 4.50 mass %, the brittleness of the steel sheet increases, which renders a rolling process difficult. Therefore, the Si content is set in a range of 2.00 mass % to 4.50 mass %. The Si content is preferably 2.50 mass % or more and more preferably 3.0 mass % or more. The Si content is preferably 4.50 mass % or less and more preferably 4.0 mass % or less.

Mn: 0.03 Mass % to 1.00 Mass %

Mn is an element necessary for improving the hot workability of steel. A Mn content of less than 0.03 mass % is insufficient to obtain this effect. On the other hand, when the Mn content exceeds 1.00 mass %, the magnetic flux density of a product sheet decreases. Therefore, the Mn content is set in a range of 0.03 mass % to 1.00 mass %. The Mn content is preferably 0.05 mass % or more and more preferably 0.06 mass % or more. The Mn content is preferably 0.20 mass % or less and more preferably 0.15 mass % or less.

Acid-soluble Al (sol.Al): 0.008 mass % or more and less than 0.030 mass %.

Al acts as an inhibitor and is an important element for secondary recrystallization of Goss-oriented grains, and an amount of 0.008 mass % or more is required to exhibit its effects. On the other hand, excessive addition of Al not only excessively suppresses the grain growth so that the secondary recrystallization of Goss-oriented grains cannot be developed, but also forms a dense oxide film on the surface, rendering it difficult to control nitridation during nitriding and inhibiting decarburization. Therefore, the sol.Al content is suppressed to less than 0.030 mass %. The Al content is preferably 0.010 mass % or more and more preferably 0.013 mass % or more. The Al content is preferably 0.022 mass % or less and more preferably 0.020 mass % or less.

N: 0.004 Mass % to 0.009 Mass %

N, like Al, acts as an inhibitor and is an important element for secondary recrystallization of Goss-oriented grains, and an amount of 0.004 mass % or more is required to exhibit its effects. On the other hand, N may cause defects such as blisters during slab heating, and therefore the content is suppressed to 0.009 mass % or less. Further, N is combined with Al and precipitates as AlN, and Al and N are combined in an atomic weight ratio of 1:1. Therefore, if the atomic weight ratio of N to Al is 1 or more, that is, if the N content is excessively deviated from (14.00/26.98)×[% sol.Al] with respect to the mass % content of sol.Al [% sol. Al], the effect of inhibitor cannot be sufficiently exhibited. Therefore, the N content is set to 0.009 mass % or less. The N content preferably satisfies the condition of (14.00/26.98)×[% sol.Al]−0.002 mass % or more. The N content preferably satisfies the condition of (14.00/26.98)×[% sol.Al]+0.002 mass % or less.

Either or both of S: 0.0005 mass % to 0.02 mass % and Se: 0.0005 mass % to 0.02 mass %

S and Se combine with Mn to form inhibitors. However, when the content of at least one selected from the group consisting of S and Se is less than 0.0005 mass %, the absolute amount of inhibitor is insufficient, and the inhibition of normal grain growth is insufficient. On the other hand, when the content of at least one selected from the group consisting of S and Se exceeds 0.02 mass %, incomplete desulfurization and deselenization occur in secondary recrystallization annealing, which causes deterioration of iron loss properties. Therefore, the content of at least one selected from the group consisting of S and Se is set in a range of 0.0005 mass % to 0.02 mass %, for each component. The content of at least one selected from the group consisting of S and Se is preferably 0.001 mass % or more and more preferably 0.002 mass % or more, for each component. The content of at least one selected from the group consisting of S and Se is preferably 0.01 mass % or less and more preferably 0.008 mass % or less, for each component.

The balance of the chemical composition of the steel slab other than the above components is Fe and inevitable impurities.

The chemical composition may further contain at least one selected from the group consisting of Sb: 0.005 mass % to 0.500 mass % and Sn: 0.005 mass % to 0.50 mass %.

Sb: 0.005 Mass % to 0.500 Mass %

Sb, as an inhibitor, is an element necessary for improving the selective growth of Goss-oriented grains, and it is added in an amount of 0.005 mass % to obtain this effect. On the other hand, excessive addition of Sb deteriorates the rollability and hampers the manufacture. Therefore, the upper limit is set to 0.500 mass %. The Sb content is preferably 0.010 mass % or more and more preferably 0.015 mass % or more. The Sb content is preferably 0.20 mass % or less and more preferably 0.10 mass % or less.

Sn: 0.005 Mass % to 0.500 Mass %

Sn, as an inhibitor, is an element necessary for improving the selective growth of Goss-oriented grains, and it is added in an amount of 0.005 mass % to obtain this effect. On the other hand, the upper limit is set to 0.500 mass % to further improve the rollability. The Sn content is preferably 0.010 mass % or more and more preferably 0.015 mass % or more. The Sn content is preferably 0.20 mass % or less and more preferably 0.10 mass % or less.

In the present disclosure, the chemical composition may further suitably contain at least one selected from the group consisting of Ni: 0.01 mass % to 1.50 mass %, Cr: 0.005 mass % to 0.50 mass %, Cu: 0.03 mass % to 0.50 mass %, P: 0.005 mass % to 0.500 mass %, As: 0.0005 mass % to 0.05 mass %, Bi: 0.005 mass % to 0.500 mass %, Mo: 0.005 mass % to 0.100 mass %, B: 0.0002 mass % to 0.0025 mass %, Te: 0.0005 mass % to 0.0100 mass %, Zr: 0.001 mass % to 0.010 mass %, Nb: 0.001 mass % to 0.010 mass %, V: 0.001 mass % to 0.010 mass %, and Ta: 0.001 mass % to 0.010 mass %, for the purpose of, for example, improving the magnetic properties.

Adding Cr within the above range can accelerate the film formation. When Cr is added, its content is more preferably 0.01 mass % or more. When Cr is added, its content is more preferably 0.1 mass % or less to keep the magnetic flux density $B_8$ within a more suitable range.

Adding Ni within the above range can increase the γ-phase fraction. When Ni is added, its content is more preferably 0.5 mass % or less to further reduce manufacturing costs and to prevent embrittlement of steel.

The following describes a method of manufacturing a grain-oriented electrical steel sheet of the present disclosure.

A steel material having the chemical composition described above is obtained by steelmaking by a conventional refining process, and then it is subjected to conventional ingot casting and blooming or continuous casting to obtain a steel slab. Alternatively, a thin steel slab with a thickness of 100 mm or less may be prepared by direct casting. The steel slab is slab-heated to a temperature of higher than the γ-phase precipitation temperature and 1380° C. or lower and subjected to hot rolling. The γ-phase precipitation temperature may be estimated in advance using equilibrium calculation software such as Thermo-Calc (Thermo-Calc Software AB), or may be verified experimentally. In the case of estimating the γ-phase precipitation temperature using Thermo-Calc ver 2017b, TCFE7: TCS Steel and Fe-alloys Database v7.0 is used as the database. Only elements available in this database are used in the calculations. If γ-phase precipitation occurs during reheating, C concentrates in the γ-phase, and the microstructure becomes non-uniform, rendering it impossible to obtain a high magnetic flux density. If slab heating is performed at temperatures exceeding 1380° C., the ferrite grain size excessively increases before hot rolling, and the recrystallization ratio decreases, rendering it impossible to obtain a high magnetic flux density after final annealing. The temperature of slab heating is preferably 1360° C. or lower. The temperature of slab heating is based on the surface temperature of the steel slab.

Next, the slab-heated steel slab is subjected to rough rolling including at least two passes of rolling at a temperature of (temperature at which γ-phase fraction reaches its maximum −20° C.) or higher with an introduced sheet thickness true strain $\varepsilon_t$ of 0.50 or more to obtain a rough-rolled sheet. As used herein, the sheet thickness true strain $\varepsilon_t$ is calculated by the following equation (1).

$$\varepsilon_t = (\text{sheet thickness after rolling}/\text{sheet thickness before rolling}) \quad (1)$$

This is because increasing the rolling temperature and increasing the rolling reduction per pass accelerate the introduction of strain and renders the recrystallization of ferritic microstructure easy. It is believed that, with this process, it is possible to refine the ferritic microstructure before finish rolling and accelerate the recrystallization of ferrite in subsequent finish rolling. As a result, the proportion of low-strain crystal grains in the microstructure of the hot-rolled sheet increases, and a high magnetic flux density can be obtained. The sheet thickness true strain $\varepsilon_t$ is more preferably 0.60 or more. The upper limit of the sheet thickness true strain $\varepsilon_t$ is not particularly limited, but it is preferably 0.80 or less.

The rough rolling preferably includes at least one pass of rolling at a temperature of (temperature at which γ-phase fraction reaches its maximum −20° C.) or higher and (temperature at which γ-phase fraction reaches its maximum +50° C.) or lower. Rolling at a temperature of (temperature at which γ-phase fraction reaches its maximum −20° C.) or higher and (temperature at which γ-phase fraction reaches its maximum +50° C.) or lower leads to a state in which a large amount of hard γ-phase is dispersed. As a result, the introduction of strain into ferrite is accelerated, the recrystallization driving force can be increased, the microstructure before finish rolling can be refined, and the magnetic flux density $B_8$ can be further increased. The rough rolling more preferably includes at least one pass of rolling at a temperature of (temperature at which γ-phase fraction reaches its maximum −15° C.) or higher. The rough rolling more preferably includes at least one pass of rolling at a temperature of (temperature at which γ-phase fraction reaches its maximum +40° C.) or lower. The rolling temperature of the rough rolling is based on the temperature of the steel sheet surface.

The number of passes of the rough rolling is preferably four in total. When the number of passes of the rough rolling is four in total, the number of times of recrystallization can be increased, the microstructure before finish rolling can be refined, and the magnetic flux density $B_8$ can be further increased.

In finish rolling, the rolling finish temperature is set to 900° C. or higher. Note that the rolling finish temperature refers to the average value of the steel sheet surface temperature at the lead end and the steel sheet surface temperature at the tail end of a coil. This is because if the rolling finish temperature is lower than 900° C., inhibitors precipitate during the finish rolling, and the inhibitors of the hot-rolled sheet are excessively coarsened. The finer the inhibitors are, the more advantageous they are for the selective growth of Goss orientation during secondary recrystallization annealing. Therefore, it is preferable to precipitate inhibitors finely at the stage of a hot-rolled sheet. The rolling finish temperature is preferably 950° C. or higher. The upper limit of the rolling finish temperature is not particularly limited. However, it is preferably 1000° C. or lower so that precipitation of coarse inhibitors after rolling can be prevented.

To prevent coarsening of inhibitors, the hot-rolled sheet is cooled for 1 second or longer at a cooling rate of 70° C./s or higher within 2 seconds after the end of finish rolling, and the hot-rolled sheet after cooling is coiled at a coiling temperature of 600° C. or lower to complete the hot-rolling process. The hot-rolled sheet is preferably subjected to cooling within 1 second after the end of finish rolling. The cooling time is preferably 2 seconds or longer. The upper limit of the cooling time is not particularly limited, but it is preferably 8 seconds or shorter. The cooling rate is more preferably 80° C./s or higher. The upper limit of the cooling rate is not particularly limited, but it is more preferably 300° C./s or lower. The cooling rate is based on the temperature of the steel sheet surface. The lower limit of the coiling temperature is not particularly limited, but it is preferably 450° C. or higher. The coiling temperature is set to 600° C. or lower. The coiling temperature is the average value of the steel sheet surface temperature at the lead end and the steel sheet surface temperature at the tail end of a strip of the hot-rolled sheet.

Next, skin pass rolling may be performed after finish rolling and before hot-rolled sheet annealing. The steel sheet can be forcibly shaped by skin pass rolling. The elongation rate of the skin pass rolling is preferably 0.05% or more. By setting the elongation rate of the skin pass rolling to 0.05% or more and introducing strain into the hot-rolled sheet, it is possible to increase the size of ferrite crystal grains in the subsequent hot-rolled sheet annealing process and obtain a more favorable texture in a primary recrystallized sheet, thereby further increasing the magnetic flux density $B_8$ of the grain-oriented electrical steel sheet. However, the introduction of strain by skin pass rolling is less effective unless the recrystallization ratio Y of the hot-rolled sheet is 20% or higher. The elongation rate of the skin pass rolling is more preferably 0.1% or more. The elongation rate of the skin pass rolling is more preferably 10% or less.

Next, the hot-rolled sheet after finish rolling or the hot-rolled sheet obtained after the above-mentioned skin pass rolling is subjected to hot-rolled sheet annealing. The key point of the present disclosure is to precipitate inhibitors appropriately during hot-rolled sheet annealing according to the recrystallization ratio Y of the sheet thickness central layer of the hot-rolled sheet. The soaking temperature of the hot-rolled sheet annealing is 1000° C. or higher. The reason is as follows. When the soaking temperature is lower than 1000° C., especially in the case of a manufacturing method with no intermediate annealing provided in cold rolling as in the present disclosure, the amount of diffused inhibitor-forming element such as Al is insufficient, and precipitated inhibitors cannot grow to an appropriate size through Ostwald ripening. Further, when the soaking temperature is low, the strain that remains in crystal grains extending in the rolling direction of the hot-rolled sheet cannot be removed, which renders it difficult for the precipitated inhibitors to grow sufficiently and inhibits the development of secondary recrystallization. On the other hand, when the soaking temperature is high, inhibitors are dissolved, and the amount of the inhibitor that cannot be precipitated increases. In the present disclosure, the upper limit of the soaking temperature is determined according to the recrystallization ratio Y (%) of the hot-rolled sheet, and specifically, it is (1150-2.5Y) ° C. or lower. In other words, when the recrystallization ratio Y of the hot-rolled sheet is high, lowering the soaking temperature can increase precipitated inhibitors. Conversely, when the recrystallization ratio Y of the hot-rolled sheet is low, the hot-rolled sheet annealing should be performed at a higher soaking temperature to preferentially remove the strain in a ferritic microstructure. The soaking temperature of the hot-rolled sheet annealing is more preferably 1050° C. or higher. The soaking temperature of the hot-rolled sheet annealing is more preferably (1150° C.-2.8Y) ° C. or lower. The soaking temperature of the hot-rolled sheet annealing is based on the temperature of the steel sheet surface.

As used herein, the recrystallization ratio Y of the sheet thickness central layer of the hot-rolled sheet is determined as follows. First, the microstructure of the L-section of the hot-rolled sheet is measured by scanning electron microscope-electron back scattering diffraction (SEM-EBSD method). The L-section of the hot-rolled sheet is polished to obtain an observation plane. Measurement is performed in a sheet thickness central layer ranging from a position at a depth of ⅕ sheet thickness (a layer that is 20% inside in the thickness direction from one surface of the steel sheet) to a position at a depth of ⅘ sheet thickness (a layer that is 80% inside in the thickness direction from the above surface) of the observation plane. The measurement area in the rolling direction is 1 mm or more. The step size is set to 1.5 μm. The obtained data is analyzed by software such as OIM Analysis (v9) to perform Kernel average misorientation (KAM) map analysis. The calculation point for the KAM value is the second proximity point. The KAM value reflects local crystal orientation changes due to dislocations in the microstructure, and it is thought to have a good correlation with microscopic strain. In an area with little strain such as a recrystallized grain, the value is as low as 0.5 or less. As used herein, the area ratio of an area where the KAM value is 0.4 or less in an area ranging from a position at a depth of ¼ sheet thickness to a position at a depth of ¾ sheet thickness is defined as the recrystallization ratio Y. The thickness range to be measured is extremely important in the evaluation of the KAM value. Generally, large shear strain occurs on the surface side of a steel sheet during a hot rolling process. Since strain is the driving force for recrystallization development, the recrystallization ratio is higher in a sheet thickness surface layer of a hot-rolled sheet than in other parts. For example, in a sample where the area ratio of an area with the KAM value being 0.4 or less to an area ranging from a position at a depth of ¼ sheet thickness to a position at a depth of ¾ sheet thickness was determined to be 29%, the area ratio of an area with the KAM value being 0.4 or less to an area of the total sheet thickness was determined to be 50%.

To obtain an extremely excellent magnetic flux density $B_8$, the recrystallization ratio Y of the hot-rolled sheet is preferably 15% or more, more preferably 18% or more, even more preferably 20% or more, and most preferably 24% or more.

After hot-rolled sheet annealing, the hot-rolled and annealed sheet is subjected to cold rolling to obtain a cold-rolled sheet with a final sheet thickness. In this method without intermediate annealing, the soaking time for hot-rolled sheet annealing is set to 60 seconds or longer to accelerate the Ostwald ripening of precipitated inhibitors. After soaking, the hot-rolled and annealed sheet is cooled to 80° C. or lower by any one of rapid cooling, slow cooling, and isothermal holding, or a combination thereof, without raising the steel sheet temperature. In this case, (1) a temperature range of 800° C. or higher is an important temperature range for the Ostwald ripening of inhibitors. Therefore, a first average cooling rate $v_1$ from the soaking temperature to 800° C. is preferably lower than 40° C./s to accelerate inhibitor growth. The first average cooling rate $v_1$ from the soaking temperature to 800° C. is more preferably 30° C./s or lower. (2) A temperature range of 650° C. to 800° C. is a temperature range related to the precipitation of carbides. To suppress the formation of coarse carbides, a second average cooling rate $v_2$ from 800° C. to 650° C. is preferably equal to or higher than the first average cooling rate $v_1$. (2) A temperature range of 400° C. to 650° C. is a temperature range related to the precipitation of silicon nitrides. The holding time t3 of the hot-rolled sheet in the temperature range of 650° C. to 400° C. is preferably 10 seconds or longer. By setting the holding time t3 to 10 seconds or longer, N that cannot be precipitated at high temperatures of 1000° C. or higher can be precipitated as silicon nitrides, which increases the magnetic flux density of a steel sheet after final annealing. Although the detailed mechanism is still unclear, it seems that when N is precipitated as silicon nitrides in a hot-rolled and annealed sheet, the amount of MN precipitated increases during decarburization annealing and the effects of inhibitors improve compared to when N is in a solid solution state, and therefore the magnetic flux density of a steel sheet after final annealing increases. By holding the hot-rolled sheet isothermally in this temperature range for 10 seconds or longer or by cooling the hot-rolled sheet for 10 seconds or longer with a cooling method that does not use water, the holding time t3 of the hot-rolled sheet in the temperature range of 650° C. to 400° C. can be 10 seconds or longer. The holding time $t_3$ of the hot-rolled sheet in the temperature range of 650° C. to 400° C. is more preferably 15 seconds or longer. (4) A temperature range of 400° C. or lower is a temperature range related to suppressing coarsening of carbides or ensuring the amount of solute carbon. In this temperature range, cooling is preferably performed at a cooling rate of 50° C./s or higher for 2 seconds or longer. The cooling is more preferably performed in a temperature range of 400° C. or lower at a cooling rate of 50° C./s or higher for 3 seconds or longer. Each cooling temperature and cooling rate of the hot-rolled sheet annealing is based on the temperature of the steel sheet surface.

Cold rolling may be either tandem rolling (one-direction rolling) or reverse rolling, and a known warm rolling technique or inter-pass aging technique may be used. The rolling ratio of the cold rolling is set to 88% or more and 91% or less. When the rolling ratio of the cold rolling is 88% or more and 91% or less, the texture of a primary recrystallized sheet can be made a texture suitable for selective growth of Goss-oriented grains during secondary recrystallization.

The final sheet thickness of the cold-rolled sheet is preferably 0.15 mm or more from the viewpoint of reducing rolling load. The upper limit of the final sheet thickness of the grain-oriented electrical steel sheet is not particularly limited, but it is preferably 0.30 mm.

The cold-rolled sheet with the final sheet thickness is then subjected to primary recrystallization annealing. The annealing temperature of the primary recrystallization annealing is, if it also serves as decarburization annealing, preferably in a range of 800° C. to 900° C. from the viewpoint of allowing the decarburization reaction to proceed rapidly, and the atmosphere is preferably a wet atmosphere. Note that decarburization annealing may be performed separately from the primary recrystallization annealing. The annealing temperature of the primary recrystallization annealing is based on the temperature of the steel sheet surface.

Next, the primary recrystallization annealed sheet is subjected to secondary recrystallization annealing to obtain a grain-oriented electrical steel sheet. In a case where iron loss properties and reduction of transformer noise are of particular importance, it is preferable to apply an annealing separator mainly composed of MgO to the surface (one side or both sides) of the primary recrystallization annealed sheet, dry, and then subject the sheet to secondary recrystallization annealing. As used herein, “mainly composed of MgO” means that the MgO content is 80 mass % or more with respect to the total annealing separator. By applying the annealing separator to the surface of the primary recrystallization annealed sheet and then performing secondary recrystallization annealing, a secondary recrystallized texture in which grains are highly accorded with the Goss orientation can be developed, and a forsterite film can be formed on the steel sheet surface. On the other hand, in a case where punchability is emphasized and no forsterite film is formed, it is preferable to apply no annealing separator, or to apply an annealing separator mainly composed of, for example, silica or alumina and perform secondary recrystallization annealing. As used herein, “mainly composed of, for example, silica or alumina” means that the content of silica or alumina or the like is 80 mass % or more with respect to the total annealing separator. Further, in a case of forming no forsterite film, it is also effective to apply an annealing separator by electrostatic coating, which does not bring in moisture. A known heat-resistant inorganic material sheet may be used in place of the annealing separator. For example, the heat-resistant inorganic material sheet includes silica, alumina, and mica.

Regarding the conditions of the secondary recrystallization annealing, in a case of forming a forsterite film, it is preferable to maintain the temperature in the vicinity of 800° C. to 1050° C. for 20 hours or longer to develop and complete secondary recrystallization, and then raise the temperature to 1100° C. or higher. In a case where iron loss properties are emphasized and purification treatment is performed, it is more preferable to further raise the temperature to about 1200° C. On the other hand, in a case of forming no forsterite film, the annealing process can be completed with the temperature raised to 800° C. to 1050° C., since it is enough to complete secondary recrystallization. The annealing temperature of the secondary recrystallization annealing is based on the temperature of the steel sheet surface. Alternatively, if it is difficult to directly measure the temperature of the steel sheet surface, the temperature of the steel sheet surface estimated from the furnace temperature or the like may be used as the annealing temperature of the secondary recrystallization annealing.

The unreacted annealing separator on the surface of the secondary recrystallization annealed sheet (grain-oriented electrical steel sheet) obtained after secondary recrystallization annealing may be removed by water washing, brushing, acid cleaning, or other means. The secondary recrystallization annealed sheet may further be subjected to flattening annealing. The secondary recrystallization annealing is usually performed in coil form, which results in coil set. The coil set may deteriorate the iron loss properties. Performing flattening annealing can adjust the shape and further reduce the iron loss. Further, when the steel sheets are laminated and used, it is effective to form an insulating coating on the surface of the steel sheets during or before or after the flattening annealing. To reduce the iron loss, it is particularly preferable to form a tension-applying coating that applies tension to the steel sheet as an insulating coating. In addition to a method of applying a tension-applying coating via a binder, a method of depositing an inorganic material on the surface layer of the steel sheet by physical vapor deposition or chemical vapor deposition instead of a forsterite film and then forming an insulating coating thereon can also be used to form a tension-applying coating. With these methods, it is possible to form an insulating coating with excellent coating adhesion and significant iron loss reducing effects.

To further reduce the iron loss, it is preferable to subject the grain-oriented electrical steel sheet to magnetic domain refining treatment. Known methods of magnetic domain refining treatment may be used, such as a method of forming grooves on the surface (front or back) of the grain-oriented electrical steel sheet (steel sheet after final annealing); a method of introducing linear or point-like thermal strain or impact strain by plasma irradiation, laser irradiation, electron beam irradiation, or the like; and a method of etching the surface of a cold-rolled sheet that has been cold-rolled to the final sheet thickness or a steel sheet in an intermediate process to form grooves.

Manufacturing conditions other than those described above may follow a conventional method.

The technique of the present disclosure renders it possible to form a crystal texture that is suitable for increasing the magnetic flux density after secondary recrystallization in a primary recrystallized sheet, by properly managing the rough rolling pass schedule and increasing the presence frequency of crystal grains with low strain in a hot-rolled sheet, even with a chemical composition that actively utilizes inhibitors by containing 0.008 mass % or more of Al. As a result, it is possible to manufacture a grain-oriented electrical steel sheet that exhibits excellent magnetic properties compared to conventional techniques. Using a grain-oriented electrical steel sheet manufactured with this technique in a transformer can not only reduce the energy use efficiency but also reduce transformer noise. The method of manufacturing a grain-oriented electrical steel sheet not only renders it possible to efficiently use power equipment such as a transformer but also contributes to reducing noise during operation caused by magnetostriction.

According to the present disclosure, it is possible to exhibit excellent magnetic properties compared to conventional techniques. According to the manufacturing method of the present disclosure, it is possible to manufacture a grain-oriented electrical steel sheet with a magnetic flux density $B_8$ of 1.935 T or higher. The magnetic flux density $B_8$ is measured by cutting an Epstein test piece from the grain-oriented electrical steel sheet and performing measurement in accordance with the Epstein's method described in JIS C2550.

EXAMPLES

Steel materials having the chemical compositions listed in Table 4, each with the balance consisting of Fe and inevitable impurities, were prepared by steelmaking and formed into steel slabs by continuous casting. Each of the steel slabs was subjected to slab heating and to rough rolling to obtain a rough-rolled sheet, the rough-rolled sheet was subjected to finish rolling to obtain a hot-rolled sheet, the hot-rolled sheet was cooled within 1.5 seconds after the end of the finish rolling, the hot-rolled sheet obtained after cooling was coiled, and the hot-rolled sheet was subjected to hot-rolled sheet annealing to obtain a hot-rolled and annealed sheet, under the conditions listed in Table 5. The γ-phase precipitation temperature and the temperature at which the γ-phase fraction reached its maximum (γ-phase fraction maximum temperature) were calculated by Thermo-Calc ver. 2017b.

As used herein, condition (1) for rough rolling is "at least two passes of rolling at a temperature of (temperature at which γ-phase fraction reaches its maximum −20° C.) or higher with an introduced sheet thickness true strain $\varepsilon_t$ of 0.50 or more". Condition (2) is "at least one pass of rolling at a temperature of (temperature at which γ-phase fraction reaches its maximum −20° C.) or higher and (temperature at which γ-phase fraction reaches its maximum +50° C.) or lower". Condition (3) is "the number of passes of rough rolling is four in total". In Table 5, "O" indicates that the condition is satisfied, and "x" indicates that the condition is not satisfied. The finisher delivery temperature (FDT) was the average value of the steel sheet surface temperature at the lead end and the steel sheet surface temperature at the tail end of a strip. The sheet thickness after hot rolling was 2.2 mm to 2.3 mm in all cases. After performing hot-rolled sheet annealing under the conditions listed in Table 5, the sheets were subjected to cold rolling at a rolling ratio of 90% to obtain a sheet thickness of 0.22 mm. Next, the sheets were subjected to primary recrystallization annealing at 860° C. for 120 seconds in a wet atmosphere of 60 vol % H2-40 vol % N2 with a dew point of 58° C. to obtain primary recrystallized sheets. An annealing separator mainly composed of MgO was applied to the surface of the primary recrystallized sheets, and then the sheets were subjected to secondary recrystallization annealing at 1200° C. for 50 hours. Subsequently, a phosphate-based insulation tension coating was applied and baked on each sheet, and flattening annealing was performed for the purpose of flattening the resulting steel strips to obtain product sheets. Epstein test pieces were cut from the resulting product sheets, and the magnetic flux density $B_8$ was measured with the method described above. Further, the recrystallization ratio Y of the hot-rolled sheet obtained after coiling was measured with the method described above. The results are listed in Table 5. If the magnetic flux density $B_8$ was 1.935 T or higher, it was judged to have an excellent magnetic flux density.

TABLE 4

| No. | Chemical composition (mass %) C | Si | Mn | Al | N | Se | S | Sb | Sn | Others | γ-phase precipitation temperature (° C.) | γ-phase fraction maximum temperature (° C.) |
|---|---|---|---|---|---|---|---|---|---|---|---|---|
| A | 0.055 | 3.39 | 0.08 | 0.014 | 0.0071 | — | 0.0030 | 0.015 | — | | 1310 | 1142 |
| B | 0.052 | 3.38 | 0.08 | 0.015 | 0.0075 | 0.003 | 0.0015 | 0.020 | — | | 1301 | 1151 |
| C | 0.060 | 3.41 | 0.08 | 0.014 | 0.0070 | 0.006 | — | 0.030 | — | | 1324 | 1150 |
| D | 0.058 | 3.32 | 0.06 | 0.017 | 0.0085 | 0.010 | — | 0.030 | — | Ni: 0.35, Cr: 0.05, Cu: 0.05 | 1350 | 1160 |
| E | 0.049 | 3.41 | 0.06 | 0.018 | 0.0087 | 0.010 | — | 0.040 | 0.015 | P: 0.03, Mo: 0.025 | 1280 | 1130 |
| F | 0.055 | 3.38 | 0.08 | 0.016 | 0.0080 | — | 0.0030 | 0.030 | — | As: 0.0007, Bi: 0.007 | 1310 | 1140 |
| G | 0.055 | 3.37 | 0.07 | 0.016 | 0.0075 | — | 0.0030 | 0.080 | — | B: 0.0005, Nb: 0.005 | 1308 | 1140 |
| H | 0.065 | 3.32 | 0.08 | 0.016 | 0.0075 | 0.008 | 0.0006 | 0.035 | — | Mo: 0.010, Te: 0.002, Zr: 0.003 | 1343 | 1160 |
| I | 0.055 | 3.30 | 0.12 | 0.015 | 0.0070 | 0.008 | — | 0.030 | — | Ni: 0.05, Cr: 0.05, Cu: 0.05, P: 0.05, Ta: 0.001 | 1318 | 1150 |
| J | 0.045 | 3.42 | 0.11 | 0.013 | 0.0065 | 0.008 | 0.0006 | 0.030 | — | V: 0.006, Ta: 0.003 | 1281 | 1130 |
| K | 0.074 | 3.38 | 0.07 | 0.016 | 0.0080 | 0.007 | 0.0050 | 0.050 | — | Mo: 0.010, Cr: 0.01 | 1338 | 1160 |
| L | 0.072 | 3.40 | 0.13 | 0.021 | 0.0085 | 0.007 | 0.0060 | 0.030 | — | Cu: 0.03, B: 0.0005, P: 0.10 | 1338 | 1160 |
| M | 0.055 | 3.40 | 0.13 | 0.018 | 0.0090 | 0.010 | 0.0050 | — | 0.120 | Cu: 0.03, B: 0.0005 | 1302 | 1150 |
| N | 0.065 | 3.40 | 0.13 | 0.014 | 0.0070 | 0.010 | 0.0050 | — | — | Cr: 0.07, Mo: 0.015 | 1325 | 1160 |

TABLE 5

| | | | Rough rolling | | | | | | | | | | |
|---|---|---|---|---|---|---|---|---|---|---|---|---|---|
| No. | Steel sample ID | Slab reheating temperature (° C.) | Condition (1) | Condition (2) | Condition (3) | Strain of 1st path | Temperature of 1st path (° C.) | Strain of 2nd path | Temperature of 2nd path (° C.) | Strain of 3rd path | Temperature of 3rd path (° C.) | Strain of 4th path | Temperature of 4th path (° C.) |
| 1 | A | 1320 | ○ | ○ | X | 0.43 | 1270 | 0.76 | 1215 | 0.56 | 1160 | | |
| 2 | B | 1320 | ○ | ○ | X | 0.43 | 1270 | 0.76 | 1220 | 0.56 | 1135 | | |
| 3 | C | 1360 | ○ | ○ | X | 0.38 | 1310 | 0.63 | 1255 | 0.69 | 1200 | | |
| 4 | D | 1380 | ○ | ○ | X | 0.38 | 1330 | 0.63 | 1275 | 0.69 | 1200 | | |
| 5 | F | 1300 | ○ | ○ | ○ | 0.30 | 1250 | 0.35 | 1215 | 0.54 | 1170 | 0.56 | 1135 |
| 6 | F | 1320 | ○ | ○ | X | 0.43 | 1270 | 0.76 | 1215 | 0.56 | 1160 | | |
| 7 | G | 1320 | ○ | ○ | X | 0.47 | 1270 | 0.56 | 1215 | 0.69 | 1160 | | |
| 8 | H | 1360 | ○ | ○ | X | 0.38 | 1310 | 0.63 | 1255 | 0.69 | 1190 | | |
| 9 | I | 1350 | ○ | ○ | X | 0.47 | 1300 | 0.56 | 1250 | 0.69 | 1190 | | |
| 10 | J | 1300 | ○ | ○ | ○ | 0.25 | 1250 | 0.54 | 1210 | 0.41 | 1170 | 0.56 | 1130 |
| 11 | A | 1350 | ○ | ○ | ○ | 0.30 | 1300 | 0.35 | 1260 | 0.54 | 1220 | 0.56 | 1175 |
| 12 | C | 1350 | ○ | ○ | ○ | 0.25 | 1300 | 0.54 | 1255 | 0.41 | 1220 | 0.56 | 1180 |
| 13 | D | 1360 | ○ | ○ | ○ | 0.30 | 1310 | 0.35 | 1275 | 0.54 | 1230 | 0.56 | 1190 |
| 14 | I | 1350 | ○ | ○ | ○ | 0.30 | 1300 | 0.35 | 1260 | 0.54 | 1210 | 0.56 | 1170 |
| 15 | A | 1320 | ○ | ○ | X | 0.47 | 1270 | 0.56 | 1215 | 0.69 | 1160 | | |
| 16 | C | 1330 | ○ | ○ | X | 0.43 | 1280 | 0.76 | 1225 | 0.56 | 1170 | | |
| 17 | D | 1380 | ○ | ○ | X | 0.38 | 1330 | 0.63 | 1280 | 0.69 | 1180 | | |
| 18 | I | 1350 | ○ | ○ | X | 0.50 | 1300 | 0.55 | 1240 | 0.63 | 1175 | | |
| 19 | A | 1280 | ○ | ○ | X | 0.43 | 1230 | 0.76 | 1175 | 0.56 | 1125 | | |
| 20 | B | 1350 | X | X | X | 0.47 | 1300 | 0.73 | 1245 | 0.49 | 1205 | | |
| 21 | E | 1350 | ○ | X | X | 0.50 | 1300 | 0.55 | 1250 | 0.63 | 1190 | | |
| 22 | A | 1320 | ○ | ○ | X | 0.50 | 1270 | 0.55 | 1215 | 0.63 | 1160 | | |
| 23 | T | 1350 | ○ | ○ | X | 0.47 | 1300 | 0.56 | 1245 | 0.69 | 1190 | | |
| 24 | I | 1320 | ○ | ○ | X | 0.43 | 1270 | 0.76 | 1215 | 0.56 | 1160 | | |
| 25 | C | 1360 | ○ | ○ | X | 0.43 | 1310 | 0.76 | 1260 | 0.56 | 1200 | | |
| 26 | D | 1380 | ○ | ○ | X | 0.38 | 1330 | 0.63 | 1275 | 0.69 | 1200 | | |
| 27 | I | 1350 | ○ | ○ | X | 0.43 | 1300 | 0.76 | 1245 | 0.56 | 1190 | | |
| 28 | F | 1320 | ○ | ○ | X | 0.43 | 1270 | 0.76 | 1215 | 0.56 | 1160 | | |
| 29 | B | 1320 | ○ | ○ | X | 0.43 | 1270 | 0.76 | 1220 | 0.56 | 1135 | | |
| 30 | K | 1340 | ○ | ○ | X | 0.47 | 1240 | 0.56 | 1245 | 0.69 | 1185 | | |
| 32 | L | 1350 | ○ | ○ | X | 0.50 | 1300 | 0.55 | 1240 | 0.63 | 1175 | | |
| 33 | M | 1350 | ○ | ○ | X | 0.50 | 1300 | 0.55 | 1240 | 0.63 | 1175 | | |
| 34 | N | 1350 | ○ | ○ | X | 0.50 | 1300 | 0.55 | 1240 | 0.63 | 1175 | | |

TABLE 5-continued

| No. | Finish rolling FDT /° C. average of L and T | Cooling | Coiling temperature (° C.) | Y (%) | 1150-2.5Y (° C.) | Skin pass Elongation rate (%) | Hot-rolled sheet annealing: Soaking temperature (° C.) | v1 (° C./s) | v2 (° C./s) | t3 (s) | Cooling to 400° C. or lower | Magnetic flux density B8 (T) | Remarks |
|---|---|---|---|---|---|---|---|---|---|---|---|---|---|
| 1 | 945 | 100° C./s × 4 s | 545 | 18 | 1105 | None | 1100 | 35 | 50 | 12 | 50° C./s × 3 s | 1.935 | Example |
| 2 | 945 | 100° C./s × 4 s | 545 | 18 | 1105 | None | 1100 | 35 | 50 | 12 | 50° C./s × 3 s | 1.938 | Example |
| 3 | 955 | 80° C./s × 5 s | 555 | 23 | 1093 | None | 1080 | 35 | 50 | 12 | 50° C./s × 3 s | 1.944 | Example |
| 4 | 965 | 100° C./s × 4 s | 565 | 22 | 1095 | None | 1090 | 35 | 50 | 12 | 50° C./s × 3 s | 1.940 | Example |
| 5 | 930 | 100° C./s × 4 s | 530 | 15 | 1113 | None | 1100 | 35 | 50 | 12 | 50° C./s × 3 s | 1.940 | Example |
| 6 | 945 | 80° C./s × 5 s | 545 | 16 | 1110 | None | 1100 | 30 | 50 | 12 | 50° C./s × 2 s | 1.936 | Example |
| 7 | 945 | 100° C./s × 4 s | 545 | 12 | 1120 | None | 1110 | 35 | 50 | 12 | 50° C./s × 3 s | 1.937 | Example |
| 8 | 955 | 100° C./s × 4 s | 555 | 20 | 1100 | None | 1100 | 35 | 50 | 12 | 50° C./s × 3 s | 1.946 | Example |
| 9 | 950 | 80° C./s × 5 s | 550 | 18 | 1105 | None | 1100 | 30 | 50 | 12 | 50° C./s × 3 s | 1.946 | Example |
| 10 | 915 | 100° C./s × 4 s | 515 | 16 | 1110 | None | 1100 | 35 | 50 | 12 | 50° C./s × 3 s | 1.937 | Example |
| 11 | 945 | 100° C./s × 4 s | 545 | 20 | 1100 | 0.15 | 1100 | 35 | 50 | 12 | 50° C./s × 3 s | 1.941 | Example |
| 12 | 940 | 80° C./s × 5 s | 540 | 22 | 1095 | 0.01 | 1080 | 35 | 50 | 12 | 50° C./s × 3 s | 1.943 | Example |
| 13 | 930 | 100° C./s × 4 s | 530 | 24 | 1090 | None | 1075 | 35 | 50 | 12 | 50° C./s × 4 s | 1.943 | Example |
| 14 | 935 | 80° C./s × 5 s | 535 | 22 | 1095 | None | 1080 | 30 | 50 | 12 | 50° C./s × 3 s | 1.950 | Example |
| 15 | 945 | 100° C./s × 4 s | 545 | 19 | 1103 | 0.01 | 1100 | 35 | 50 | 12 | 50° C./s × 3 s | 1.936 | Example |
| 16 | 950 | 100° C./s × 4 s | 550 | 18 | 1105 | 0.10 | 1100 | 35 | 50 | 12 | 50° C./s × 3 s | 1.940 | Example |
| 17 | 955 | 80° C./s × 5 s | 555 | 22 | 1095 | 1.00 | 1080 | 35 | 50 | 12 | 50° C./s × 2 s | 1.939 | Example |
| 18 | 940 | 100° C./s × 4 s | 540 | 20 | 1100 | 0.50 | 1100 | 35 | 50 | 12 | 50° C./s × 3 s | 1.949 | Example |
| 19 | 900 | 130° C./s × 3 s | 510 | 5 | 1138 | None | 1125 | 35 | 50 | 12 | 50° C./s × 3 s | 1.925 | Comparative Example |
| 20 | 960 | 80° C./s × 5 s | 560 | 13 | 1118 | None | 1100 | 35 | 50 | 12 | 50° C./s × 3 s | 1.932 | Comparative Example |
| 21 | 950 | 100° C./s × 4 s | 550 | 12 | 1120 | None | 1100 | 35 | 50 | 12 | 50° C./s × 3 s | 1.932 | Example |
| 22 | 945 | 80° C./s × 5 s | 545 | 16 | 1110 | None | 1125 | 35 | 50 | 12 | 50° C./s × 3 s | 1.931 | Comparative Example |
| 23 | 950 | 80° C./s × 5 s | 550 | 18 | 1105 | None | 1100 | 60 | 50 | 12 | 50° C./s × 2 s | 1.941 | Example |
| 24 | 890 | 100° C./s × 4 s | 490 | 11 | 1123 | None | 1100 | 35 | 50 | 12 | 50° C./s × 3 s | 1.932 | Comparative Example |
| 25 | 955 | 100° C./s × 4 s | 555 | 23 | 1093 | None | 1080 | 35 | 25 | 12 | 50° C./s × 3 s | 1.937 | Example |
| 26 | 965 | 100° C./s × 4 s | 565 | 22 | 1095 | None | 1090 | 35 | 25 | 12 | 50° C./s × 3 s | 1.935 | Example |
| 27 | 950 | 80° C./s × 5 s | 550 | 18 | 1105 | None | 1100 | 35 | 25 | 12 | 60° C./s × 3 s | 1.938 | Example |
| 28 | 945 | 80° C./s × 5 s | 545 | 16 | 1110 | None | 1100 | 30 | 50 | 12 | 50° C./s × 2 s | 1.934 | Comparative Example |
| 29 | 945 | 100° C./s × 4 s | 545 | 18 | 1105 | None | 990 | 35 | 50 | 12 | 50° C./s × 3 s | 1.755 | Comparative Example |
| 30 | 940 | 80° C./s × 5 s | 540 | 27 | 1083 | None | 1080 | 30 | 50 | 12 | 50° C./s × 3 s | 1.951 | Example |
| 32 | 940 | 100° C./s × 4 s | 540 | 25 | 1088 | None | 1080 | 30 | 50 | 12 | 50° C./s × 3 s | 1.940 | Example |
| 33 | 940 | 100° C./s × 4 s | 540 | 18 | 1105 | None | 1100 | 30 | 50 | 12 | 50° C./s × 3 s | 1.940 | Example |
| 34 | 940 | 100° C./s × 4 s | 540 | 20 | 1100 | None | 1080 | 30 | 50 | 12 | 50° C./s × 3 s | 1.935 | Example |

Underlined if outside the appropriate range of the present disclosure.

The invention claimed is:

1. A method of manufacturing a grain-oriented electrical steel sheet, comprising:

preparing a steel slab having a chemical composition containing

C: 0.005 mass % to 0.085 mass %,

Si: 2.00 mass % to 4.50 mass %,

Mn: 0.03 mass % to 1.00 mass %, sol.Al: 0.008 mass % or more and less than 0.030 mass %, and N: 0.004 mass % to 0.009 mass % or less, and further containing either or both of S: 0.0005 mass % to 0.02 mass % and Se: 0.0005 mass % to 0.02 mass %, with the balance being Fe and inevitable impurities, subjecting the steel slab to slab heating to a temperature of higher than a γ-phase precipitation temperature and 1380° C. or lower, the γ-phase precipitation temperature being determined by equilibrium calculation, next, subjecting the steel slab to rough rolling including at least two passes of rolling at a temperature of (temperature at which γ-phase fraction reaches its maximum −20° C.) or higher with an introduced sheet thickness true strain $\varepsilon_t$ of 0.50 or more for each pass to obtain a rough-rolled sheet, the temperature at which γ-phase fraction reaches its maximum being determined by equilibrium calculation, next, subjecting the rough-rolled sheet to finish rolling where a rolling finish temperature is 900° C. or higher to obtain a hot-rolled sheet, the hot-rolled sheet having a recrystallization ratio Y of 10% or higher and 60% or less, next, cooling the hot-rolled sheet for 1 second or longer at a cooling rate of 70° C./s or higher within 2 seconds after an end of the finish rolling, coiling the hot-rolled sheet obtained after cooling at a coiling temperature of 600° C. or lower, next, subjecting the hot-rolled sheet obtained after coiling to hot-rolled sheet annealing for soaking at a soaking temperature of 1000° C. or higher and (1150-2.5Y)° C. or lower for 60 seconds or longer to obtain a hot-rolled and annealed sheet, where Y (%) is a recrystallization ratio of a sheet thickness central layer of the hot-rolled sheet obtained after coiling, next, subjecting the hot-rolled and annealed sheet to cold rolling at a rolling ratio of 88% or more and 91% or less to obtain a cold-rolled sheet with a final sheet thickness, next, subjecting the cold-rolled sheet to primary recrystallization annealing to obtain a primary recrystallization annealed sheet, and next, subjecting the primary recrystallization annealed sheet to secondary recrystallization annealing to obtain a grain-oriented electrical steel sheet, wherein the sheet thickness true strain Et is calculated by the following equation (1)

$$\varepsilon_t = -\ln(\text{sheet thickness after rolling/sheet thickness before rolling}) \quad (1).$$

2. The method of manufacturing a grain-oriented electrical steel sheet according to claim 1, wherein the chemical composition further contains at least one selected from the group consisting of Sb: 0.005 mass % to 0.500 mass %, and Sn: 0.005 mass % to 0.500 mass %.

3. The method of manufacturing a grain-oriented electrical steel sheet according to claim 1, wherein the chemical composition further contains at least one selected from the group consisting of Ni: 0.01 mass % to 1.50 mass %, Cr: 0.005 mass % to 0.50 mass %, Cu: 0.03 mass % to 0.50 mass %, P: 0.005 mass % to 0.500 mass %, As: 0.0005 mass % to 0.050 mass %, Bi: 0.005 mass % to 0.500 mass %, Mo: 0.005 mass % to 0.100 mass %, B: 0.0002 mass % to 0.0025 mass %, Te: 0.0005 mass % to 0.0100 mass %, Zr: 0.001 mass % to 0.010 mass %, Nb: 0.001 mass % to 0.010 mass %, V: 0.001 mass % to 0.010 mass %, and Ta: 0.001 mass % to 0.010 mass %.

4. The method of manufacturing a grain-oriented electrical steel sheet according to claim 1, wherein the rough rolling includes at least one pass of rolling at a temperature of (the temperature at which γ-phase fraction reaches its maximum−20° C.) or higher and (the temperature at which γ-phase fraction reaches its maximum+50° C.) or lower.

5. The method of manufacturing a grain-oriented electrical steel sheet according to claim 1, wherein the rough rolling has four or more passes in total.

6. The method of manufacturing a grain-oriented electrical steel sheet according to claim 1, wherein the hot-rolled sheet obtained after the soaking is subjected to cooling where a first average cooling rate $v_1$ from the soaking temperature to 800° C. is lower than 40° C./s and a second average cooling rate $v_2$ from 800° C. to 650° C. is equal to or higher than $v_1$.

7. The method of manufacturing a grain-oriented electrical steel sheet according to claim 1, wherein the recrystallization ratio Y is 18% or higher and 60% or less.

8. The method of manufacturing a grain-oriented electrical steel sheet according to claim 1, wherein the recrystallization ratio Y is 20% or higher and 60% or less, and skin pass rolling with an elongation rate of 0.05% or more is performed after an end of the finish rolling and before hot-rolled sheet annealing.

9. The method of manufacturing a grain-oriented electrical steel sheet according to claim 1, wherein a magnetic flux density $B_8$ in a rolling direction of the grain-oriented electrical steel sheet is 1.940 T or higher.

10. The method of manufacturing a grain-oriented electrical steel sheet according to claim 2, wherein the chemical composition further contains at least one selected from the group consisting of Ni: 0.01 mass % to 1.50 mass %, Cr: 0.005 mass % to 0.50 mass %, Cu: 0.03 mass % to 0.50 mass %, P: 0.005 mass % to 0.500 mass %, As: 0.0005 mass % to 0.050 mass %, Bi: 0.005 mass % to 0.500 mass %, Mo: 0.005 mass % to 0.100 mass %, B: 0.0002 mass % to 0.0025 mass %, Te: 0.0005 mass % to 0.0100 mass %, Zr: 0.001 mass % to 0.010 mass %, Nb: 0.001 mass % to 0.010 mass %, V: 0.001 mass % to 0.010 mass %, and Ta: 0.001 mass % to 0.010 mass %.

11. The method of manufacturing a grain-oriented electrical steel sheet according to claim 2, wherein the rough rolling includes at least one pass of rolling at a temperature of (the temperature at which γ-phase fraction reaches its maximum−20° C.) or higher and (the temperature at which γ-phase fraction reaches its maximum+50° C.) or lower.

12. The method of manufacturing a grain-oriented electrical steel sheet according to claim 2, wherein the rough rolling has four or more passes in total.

13. The method of manufacturing a grain-oriented electrical steel sheet according to claim 2, wherein the hot-rolled sheet obtained after the soaking is subjected to cooling where a first average cooling rate $v_1$ from the soaking temperature to 800° C. is lower than 40° C./s and a second average cooling rate $v_2$ from 800° C. to 650° C. is equal to or higher than $v_1$.

14. The method of manufacturing a grain-oriented electrical steel sheet according to claim 2, wherein the recrystallization ratio Y is 18% or higher and 60% or less.

15. The method of manufacturing a grain-oriented electrical steel sheet according to claim 2, wherein the recrystallization ratio Y is 20% or higher and 60% or less, and skin pass rolling with an elongation rate of 0.05% or more is performed after an end of the finish rolling and before hot-rolled sheet annealing.

16. The method of manufacturing a grain-oriented electrical steel sheet according to claim 2, wherein a magnetic flux density $B_8$ in a rolling direction of the grain-oriented electrical steel sheet is 1.940 T or higher.

17. The method of manufacturing a grain-oriented electrical steel sheet according to claim 3, wherein the rough rolling includes at least one pass of rolling at a temperature of (the temperature at which γ-phase fraction reaches its maximum−20° C.) or higher and (the temperature at which γ-phase fraction reaches its maximum+50° C.) or lower.

18. The method of manufacturing a grain-oriented electrical steel sheet according to claim 3, wherein the rough rolling has four or more passes in total.

19. The method of manufacturing a grain-oriented electrical steel sheet according to claim 3, wherein the hot-rolled sheet obtained after the soaking is subjected to cooling where a first average cooling rate $v_1$ from the soaking temperature to 800° C. is lower than 40° C./s and a second average cooling rate $v_2$ from 800° C. to 650° C. is equal to or higher than $v_1$.

20. The method of manufacturing a grain-oriented electrical steel sheet according to claim 3, wherein the recrystallization ratio Y is 18% or higher and 60% or less.

* * * * *